(12) United States Patent
Kuite et al.

(10) Patent No.: US 8,204,828 B1
(45) Date of Patent: Jun. 19, 2012

(54) SYSTEM AND METHOD FOR ELECTRONIC DISTRIBUTION OF BENEFITS

(75) Inventors: Roger H. Kuite, San Diego, CA (US); Douglas P. Young, San Diego, CA (US); Leigh L. Callaway, Springfield, VA (US); David W. Andrews, Leesburg, VA (US); Ronald J. Oleksa, Winchester, VA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 09/516,949

(22) Filed: Mar. 1, 2000

(51) Int. Cl.
*G06Q 40/00* (2012.01)

(52) U.S. Cl. .................... 705/41; 705/380; 705/381

(58) Field of Classification Search ............... 705/41, 705/39, 42; 235/379, 380, 381
See application file for complete search history.

(56) References Cited

U.S. PATENT DOCUMENTS

| | | | |
|---|---|---|---|
| 5,987,439 A * | 11/1999 | Gustin et al. | 705/43 |
| 6,282,522 B1 * | 8/2001 | Davis et al. | 705/41 |
| 6,595,416 B1 * | 7/2003 | Newsome et al. | 235/381 |
| 6,609,655 B1 * | 8/2003 | Harrell | 235/380 |
| 6,609,658 B1 * | 8/2003 | Sehr | 235/384 |
| 6,615,190 B1 * | 9/2003 | Slater | 705/41 |
| 6,648,222 B2 * | 11/2003 | McDonald et al. | 235/380 |
| 6,732,922 B2 * | 5/2004 | Lindgren et al. | 235/381 |
| 6,796,497 B2 * | 9/2004 | Benkert et al. | 235/380 |
| 7,047,204 B1 * | 5/2006 | Wood et al. | 705/4 |
| 7,234,638 B2 * | 6/2007 | Lee et al. | 235/380 |
| 2003/0085272 A1 * | 5/2003 | Andrews et al. | 235/380 |

FOREIGN PATENT DOCUMENTS

| | | |
|---|---|---|
| EP | 0 623 903 A2 | 9/1994 |
| EP | 0623903 A2 | 11/1994 |
| FR | 2605770 | 10/1986 |
| FR | 2 605 770 | 4/1988 |
| FR | 2 722 899 | 1/1996 |
| FR | 2722899 A3 | 1/1996 |
| FR | 2 770 318 | 4/1999 |
| FR | 2770318 A1 | 4/1999 |
| GB | 99 01395.5 | 12/1999 |
| GB | 2338814 A | 12/1999 |
| WO | 93/20526 A1 | 10/1993 |
| WO | WO 93/20526 | 10/1993 |
| WO | 98/13794 A1 | 4/1998 |
| WO | WO 98/13794 | 4/1998 |
| WO | WO 02/41260 A2 * | 5/2002 |

OTHER PUBLICATIONS

Cubic Transportation Systems, Inc. Major Programs, Internet print showing use by WMATA of SmartTrip card in 1999.*
EBT, Electronic Benefits Transfer and Public Policy, LBJ School of Public Affairsand State of Texas Office of the Comptroller, 1998, 47 pages.*
The Regional SmarTrip System and the Regional Customer Service Center www.itsva.org/downloads/files/samarasinghe.pdf, 17 pages.*

(Continued)

*Primary Examiner* — Hani M Kazimi
(74) *Attorney, Agent, or Firm* — Kilpatrick Townsend & Stockton LLP

(57) ABSTRACT

Electronic implementation of a benefits program for distribution of mass transit system vouchers utilizes a smart card. The system and method eliminates the need for manual delivery and provides a paperless, automated system of distributing the benefits. The system further reduces the administrative costs associated with periodic manual distribution. The system may be implemented in an Intranet or Internet environment.

25 Claims, 6 Drawing Sheets

OTHER PUBLICATIONS

Oliveira, V. et al. All Food Stamp Benefits to be Issued Electronically. FoodReview. Washington: Jan.-Apr. 1998. vol. 21, Iss. 1; p. 35, 5 pgs.*

International Search Report dated Dec. 20, 2001 for International PCT Application No. PCT/US2001/040205, 3 pages.

* cited by examiner

SYSTEM AND METHOD FOR ELECTRONIC DISTRIBUTION OF BENEFITS

BACKGROUND OF THE INVENTION

The present invention relates to a system and method for distributing benefits, and more specifically to an automated system and method utilizing smart cards for electronically distributing benefits to patrons.

Purchase of mass transit fares has become more convenient with the implementation of fare cards that utilize an electronic chip to store value for credit/debit payment. Rather than fumble for bills and coins, the patron may simply touch the fare card to a fare gate reader. Reusable fare cards with read/write capability allow patrons to add time or value to payment-type fare cards, thus avoiding the inconvenience of having to carry currency, or, in the case of mass transit, exact change, for each transit use.

Metropolitan transit authorities continue to improve their services to the public and private sector. Several transit authorities in conjunction with customers such as government agencies, welfare agencies, educational institutions, and private businesses offer transit benefits programs to patrons such as employees, students and welfare recipients. Although transit benefits programs are popular, current procedures are burdensome and largely unfunded within these organizations. Each year a transit authority must deliver millions of pieces of fare media to its customers, i.e. the agencies and institutions. Periodic delivery of the fare media requires use of an armored cars since the fare media has monetary value. Typical fare media utilized for transit benefits include paper cards with magnetic strips that function solely as a value-based card. The customers, in turn, distribute the fare cards to the patrons as either direct benefits or pre-tax benefits under certain tax benefits.

The currently available fare cards are inconvenient for the patrons. Because the cards are typically issued as value-based cards, the patron cannot change the card to another card type without returning the card to a point of issue ("POI") device that is typically located at the transit authority. This requirement limits the patron's flexibility in receiving the best transit value for the benefit. Further, when a patron is due a refund or an adjustment, current procedures are manual and require the patron to restore value from a transit authority-issued fare card. As these benefits programs increase in popularity, the administrative burden and patron inconvenience will increase. Thus, there remains a need for a convenient and cost effective means to provide, to distribute, and to add value to benefit credits for use in various applications including mass transit systems.

SUMMARY OF THE INVENTION

It is an object of the present invention to provide an electronic distribution of benefits utilizing smart cards.

It is another object of the present invention to provide a smart card that allows a fare type to be changed to another fare type without the need to return the card to a point of issue device.

It is a further advantage of the present invention to provide a cost effective method to accomplish transit benefit downloads to a fare card.

Still another advantage is provide a fare card that is reusable for periodic benefits distribution.

Yet another advantage is to provide an efficient means for introducing benefits credits information into a data base utilizing a network terminal or a remote terminal connected to the data base by an Internet connection.

The electronic benefits distribution system of an exemplary embodiment utilizes a central computer accessible via a local network or the Internet to maintain benefits credits of customers and their patrons. The value of a benefit credit is downloaded onto a smart card for use by a patron, i.e. the individual who is entitled to the benefit. In the exemplary embodiment, the benefit credit on the smart card is utilized for transit authority fees including transit fares and/or parking fees. However, the electronic benefit distribution system may be used for a variety of benefits distributions including welfare credits and food-stamp credits wherein a value credit is distributed to a patron by means of a smart card.

Smart cards have found applications in many areas including pay phones, health care, banking, identity and access, pay television, gaming, metering and vending. Smart cards generally include one or more integrated circuit ("IC") located within the body of the card to receive and store information. The ICs can be read-only or have read/write capability. The smart card also contains interface means, which depend on whether the smart card is a contact-type or contactless smart card. The interface allows a computer system to add credit or subtract credit from a card. Contactless cards contain an antenna circuit for communication with an RF source, whereas contact cards require physical contact of the magnetic chip or strip and a reader machine.

In an exemplary embodiment, an issuing authority, e.g. a transit authority or a welfare agency, maintains a central computer for storing benefits information and downloading benefit values to a patron's smart card at vending machines. The customer is any organization that pre-authorizes benefits such as transit fares and parking fees. The customer is liable to the issuing authority to pay for those benefits. For example, a customer may be a public or private sector employer, a welfare agency distributing "Access to Work" benefits, or an educational institution providing benefits to its students. A patron claims the benefits and is the individual cardholder who uses the claimed benefits to pay the transit and/or parking fees. From the perspective of an employer, the patron is an employee.

Benefits credits are pre-authorized by a user who has accesses to the benefits program system. The user may browse system screens to pre-authorize benefits or to administer the system. For example, the user may be a transit authority employee making an adjustment, or an individual representing the transit authority customer who is pre-authorizing benefits. In an exemplary embodiment, the transit authority maintains customer information and profiles. The system further allows the transit authority to administer customer user permissions and access so that, for example, one customer user is not allowed to alter or view the benefits of another customer's patrons.

The benefits credit system of an exemplary embodiment allows multiple customer users to remotely maintain benefits data on the central computer utilizing their own personal computers and access through the Internet. Customer users are granted authority to view, add, change, update and hold the benefits of its patrons. The system of the exemplary embodiment further provides the customer with weekly and monthly reports via an Internet connection.

In an exemplary embodiment a patron requests benefits at a transit express vending machine. The express vending machine is connected to a station monitor/controller that sends the request to the central computer of the issuing authority. The express vending machine waits for a response message from controller for a specified time. If no response is received within the specified time then the express vending machine declines the transaction and advises the patron. If the patron data storage tables in the central computer contain one or more benefits for the patron, a single benefits response message is created and sent to the express vending machine. Each benefit associated with the patron is evaluated and approved or declined by the central computer utilizing a number of criteria including whether the benefit is expired, previously claimed, or in a hold status. If the benefit is unexpired, not claimed, and not in a hold status, the applications processor of the central computer puts a hold status on the patron benefit at the database. A hold status eliminates the possibility that duplicate benefits are processed at another express vending machine at the same time. In an exemplary embodiment, the message structure between the central computer, the station monitor/controller, and the express vending machine distinguishes between separate purses implemented on the same smart card.

Once the patron's benefits are validated, a benefits response transaction is routed back to the station monitor/controller, which in turn routes the response to the originating express vending machine. The express vending machine acknowledges receipt of the response. When the station monitor/controller receives positive acknowledgment that the express vending machine has received the transaction it notifies the central computer. If the station controller cannot send the response to the express vendor, it notifies the central computer, and the benefits which were placed on hold, if any, are released. If the central computer does not receive an acknowledgment that the benefit has been dispensed, the benefit remains on hold. Central computer software applications ensure that the benefits are properly dispensed and that neither the issuing authority nor the patron is negatively impacted.

If the benefits response transaction indicates that no benefits are available, the patron is so notified, and there is no requirement to return a benefits confirmation transaction. In an exemplary embodiment, a maximum of $200, including bonus amounts, is available for benefit download to a patron's smart card, assuming the current card value is zero. The express vendor and patron interface limits the allocated amount to ensure that the resultant card value remains within this limit. If the value of the benefits is less than the price of the fare medium selected, the patron may supplement benefits value with an approved debit or credit transaction, cash, a fare card trade-in or a combination of cash and a fare card trade-in.

Once a benefit value is downloaded onto a smart card, a confirmation transaction message is sent through the station controller to the central computer. The central computer then documents how, if at all, the benefits were used in the purchase of allowed fare product. The express vendor and the station controller must receive positive acknowledgment of receipt of the confirmation transaction before the transaction is purged from their respective memory buffers. Depending on the value authorized in the request transaction and the patron's selection, the express vendor may return unused portions of the request to the central computer to be used for subsequent claims. The central computer decrements the patron benefits values based upon the confirmation transaction, and releases the hold on the benefits. If the patron cancels a request or fails to select the option to load the requested value, the benefits confirmation transaction restores the benefits as unclaimed in the central computer benefits data storage. Once the benefit is depleted, the patron must add value to the smart card utilizing his or her own funds, or wait for a subsequent benefits period in which the customer replenishes the benefit value.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DESCRIPTION OF THE PREFERRED EMBODIMENT

Figure 1:
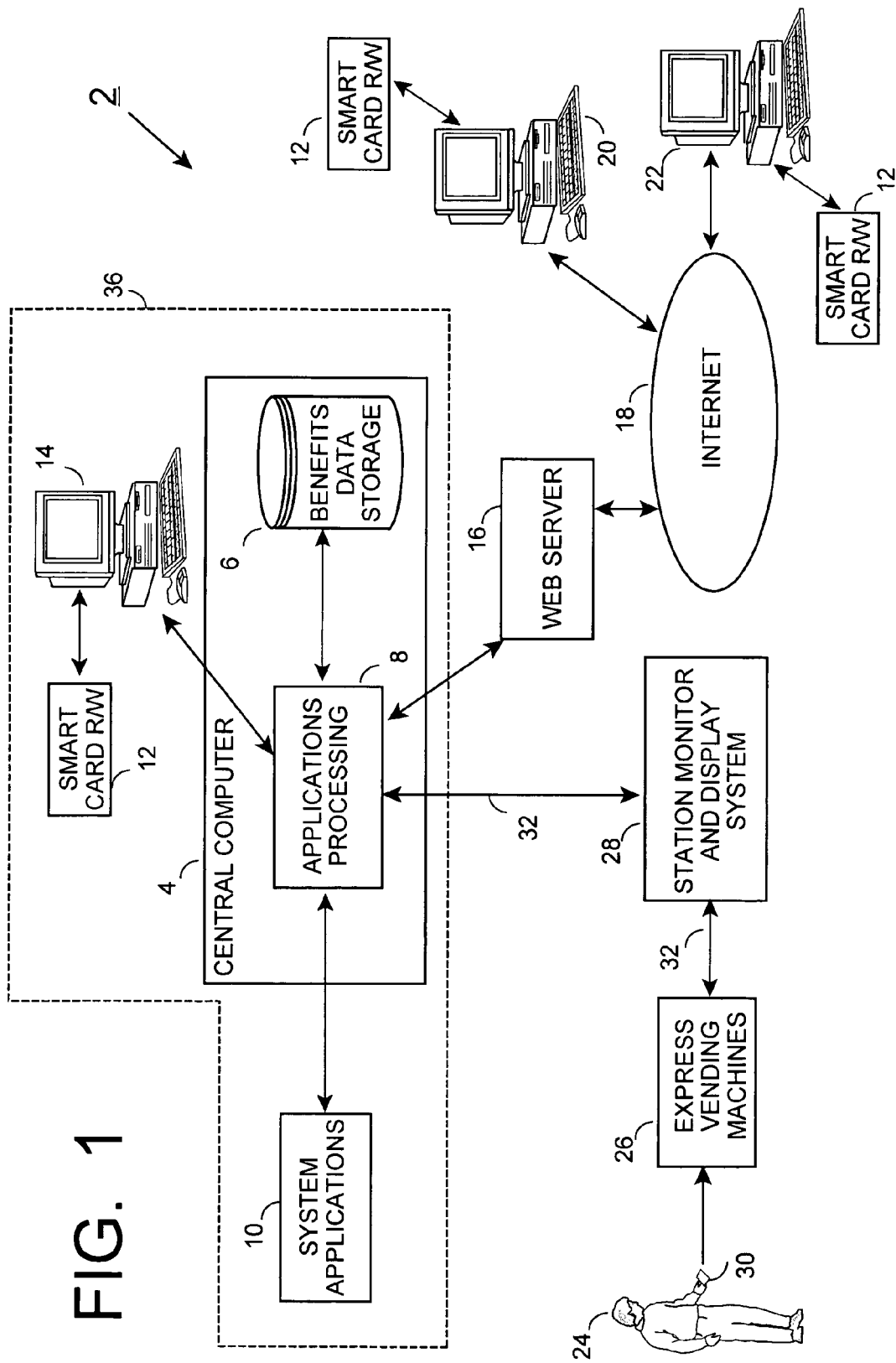
FIG. 1 is a block diagram of the Electronic Benefits Credit Distribution System of a preferred embodiment.

FIG. 1 illustrates the benefits distribution system 2 of the preferred embodiment. The system 2 utilizes a mainframe 4, or central computer, as a central point of operation within the organization of an issuing authority 36. In a preferred embodiment, a transit authority is the issuing authority 36 which operates the central computer 4 for the management of a metropolitan transit system. In alternate embodiments, the central computer 4 is located within the organization of an issuing authority 36 such as a government welfare agency. In a preferred embodiment, a transit authority 36 has administration responsibilities for the benefits distribution system 2. A transit authority user 14 accesses the system 2 to pre-authorize benefits and/or to administer the system 2. The transit authority user 14 maintains customer user 20,22 information and profiles that are stored in a benefits data storage 6 of the central computer 4. A customer user 20,22 is an organization that pre-authorizes transit fare and other benefits for their patrons 24, and is liable to the issuing authority 36 to pay for the authorized benefits. The patron 24 is the individual who claims the benefits to pay, e.g., transit fares and/or parking fees. From the perspective of an employer, the patron 24 is an employee. In another embodiment, the patron 24 of a regional welfare agency is a welfare recipient. Thus, the patron 24 is the individual holder of a smart card 30 who uses the benefits.

The transit authority user 14 may enter and update customer 20, 22 data utilizing benefits system applications 10 that include web server applications, browser-based applications and central computer applications. The benefits system applications 10 allow the transit authority user 14 to administer customer user 20,22 permissions and access to protect against unauthorized accesses to the system 2. Permissions and access procedures also ensure that, for example, one customer user 20 is not allowed to alter or view the benefits of another customer 22. The transit authority 36 administration also includes "super-user" access that allows updating of any patron 24 benefit of any associated customer 20, 22. Updating may include adding, changing, deleting, or holding a patron account. A "hold" on a patron account occurs when credit may be available, but there is a reason to deny the patron 24 access to the credit. The super-user authorization provides a contingency service in an event that a customer 20,22 is unable to make changes to their patron benefits. In a preferred embodiment of the present invention, the transit authority 36 also has the capability to prepare and authorize an adjustment benefit type so that a benefit credit of one type, e.g. a transit fare, may be converted to a parking fee credit.

In a preferred embodiment, the transit authority 36 has the option to integrate the benefits data base 6 with the transit authority accounts receivable. Integration of the benefits data base 6 and the accounts receivable enables the value distributed to the customers 20, 22 to be tracked and updated automatically by the benefits system 2. Thus, a customer 20, 22 may request and/or access the amount owed to the issuing authority 36 at any time.

The benefits credit system 2 allows multiple customer users 20, 22. Customers 20, 22 remotely maintain benefits data, including rail transit, parking and adjustment benefits, on the central computer 4 utilizing their own personal computer and access through the Internet 18 and web server 16. Manual distribution of personal computer software on floppy disk is not required for customer 20, 22 access and use of the benefits system 2. In a preferred embodiment, customer users 20,22 are granted authority to view, add, change, update and hold the benefits of its patrons 24. In an alternate embodiment, a customer user 20,22 has authority only to view patron benefits. The benefits distribution system 2 allows the customer 20, 22 to add benefits to any valid smart card 30 whether the benefits are provided by the customer or purchased by the patron. For example, and employee patron 24 may choose to have an amount deducted from his or her paycheck to be added to a monthly benefits allowance.

The system 2 of the preferred embodiment provides a "global" maintenance capability for a customer level default of patron benefits. A global change allows a customer user 20, 22 to change their customer-wide default values. The global change of patron benefits of a first customer 20, does not affect the benefits of any other customer's 22 default information. The benefits distribution system 2 also provides a "maintenance by exception" function which allows the customer users 20, 22 to change individual patron parameters where customer-wide defaults do not apply.

A patron 24 requests and receives benefits through interaction with an express vending machine 26. The patron 24 touches a smart card 30 having a unique serial number that is assigned to the patron 24 to the vendor target. Upon receipt of a smart card 30, the express vending machine 26 initiates a patron's 24 claim via a request message 32 to a station monitor and display system ("SMADS") 28. The SMADS 28 sends the request 32 to the central computer, that, in turn sends a response notice of unclaimed and unexpired benefits. Upon receipt of a response 32 from the SMADS 28, the express vendor 26 downloads a benefit value to the smart card 30. The patron 24 then is able to utilize his or her benefits to pay for selected types of transit fare media.

Before the vending machine 26 transfers a monetary value to the smart card 30, the central computer applications 10 validate that the smart card 30 is eligible for the requested benefits. In a preferred embodiment, an invalid smart card 30 is simply returned to the patron 32 with an indication of insufficient value, for example, an indication of zero dollar value available. The benefits system 2 of the preferred embodiment ensures that only those benefits that are authorized, unclaimed, unexpired and not in a hold status are allowed for download to a smart card 30 for the purchase of fare media. When a patron 24 specifies a price of the fare medium being purchased, the central computer 4 determines the value of the unclaimed benefits, and utilizes table driven logic to authorize all, part or none of the benefits to allow purchase of the selected medium. If the patron 24 does not specify a pass type with a known price, the express vending machine 26 and central computer 4 interface authorizes all eligible benefits.

To prevent multiple claims of the same benefits, a smart card 30 cannot be used to claim benefits from more than one express vending machine 26 at the same time. This safeguard is implemented at the database 6, not at the express vending machine 26 or the smart card 30. The process of claiming benefits at the express vending machine 26 to purchase fare media incorporates contingency processing which is equal to that of debit/credit transactions. Such contingency processing, discussed in detail below and shown in FIG. 7, minimizes loss of benefits data in the event of hardware or telecommunications failure.

In a preferred embodiment of the present invention, all benefit types, such as rail and parking, are added to the unrestricted cash purse of the smart card 30, or are used to purchase a transit pass. In an alternate embodiment, the system allows a requirement for placing benefit types, such as rail or parking value, on individual smart card 30 purses. In the preferred embodiment, the smart card holder, i.e. the patron 24, may change the type of issued pass. The functionality of the express vendor 26 allows the patron 24 to change the smart card's 30 pass type to any of the currently defined valid pass types. These pass types include one day passes, rail short trip passes, e.g., passes good for 7 days, and rail fast pass, e.g., unlimited rail only use for a specified period. The pass type change is initiated at the express vending machine 26 and does not require the smart card 30 to be returned to a point of issue 12 for exchange. The benefits system 2 allows a patron 24 to "toggle" between pass types while maintaining an unrestricted cash purse. Card type changes include toggling from a stored value regular fare to any valid pass type and changing from any valid pass type to any other valid pass type. When a smart card pass expires, e.g., a pass that is valid for a specific number of days from issue, the system 2 applies a default condition of a stored value only card. In a preferred embodiment, the default is applied utilizing an operational mechanism at transit system entry gates that allows value stored in the unrestricted cash purse to be used when a smart card pass expires. Once the default selection occurs, the smart card 30 remains in a stored value mode until a new pass period is initiated.

In a preferred embodiment, value placed on the smart card stored value purse continues to receive a bonus under applicable transit authority 36 rules. For example, the smart card 30 may be utilized for payment of cash value rail trips, parking fees or pass renewal but cannot be used to pay for a pass change. In a preferred embodiment, all pass related renewals or changes require new money in the form of cash deposited at the express vending machine 26, a benefits download from the central computer 4, a credit or a debit card transaction or a fare card trade-in. The benefits distribution system 2 further allows the express vending machine 26 to renew smart card passes before they expire.

In a preferred embodiment of the present invention, the transit authority 36 does not enforce tax or benefits regulations and is not liable as an enforcer of regulations. Thus, the benefits system 2 is free of edits or checks that may be perceived as enforcement procedures. However, in alternate embodiments wherein the issuing authority 36 is also the regulation-enforcing customer, the system 2 may include edits and checks of the patron profile, and may indicate the reason for smart card 30 rejection to the patron 24.

In a preferred embodiment, a system application 10 provided by the issuing authority 36 allows a patron 24 to add value to his or her benefits smart card 30. This option is desirable for instances wherein the patron's 24 unclaimed and unexpired benefits are not sufficient to purchase the selected product. The added value is provided either through the customer 20, 22 or is purchased by the patron 24. Patrons 24 may add value directly to their smart card 30 and or benefits value utilizing their own funds through the use of an express vending machine 26. Benefits may be supplement utilizing an approved credit transaction, an approved debit transaction, with cash, with a fare card trade-in, or with a combination of cash and fare card trade-in. The patron 24 is offered the option of receiving a printed receipt. A "banked" transaction results from a patron 24 presenting his or her smart card 30 to the target on the express vendor 26, inserting money at the express vendor 26, and then walking away from the express vendor 26 without touching the smart card 30 to the target of the express vendor 26 a second time to upgrade the smart card 30 value. Incomplete or "banked" transactions are automatically sent from the express vending machine 26 to the database of the central computer 4 for later claim by the patron 24. Thus, the system does not require manual processing of benefits adjustments as in prior art systems.

Figure 3:
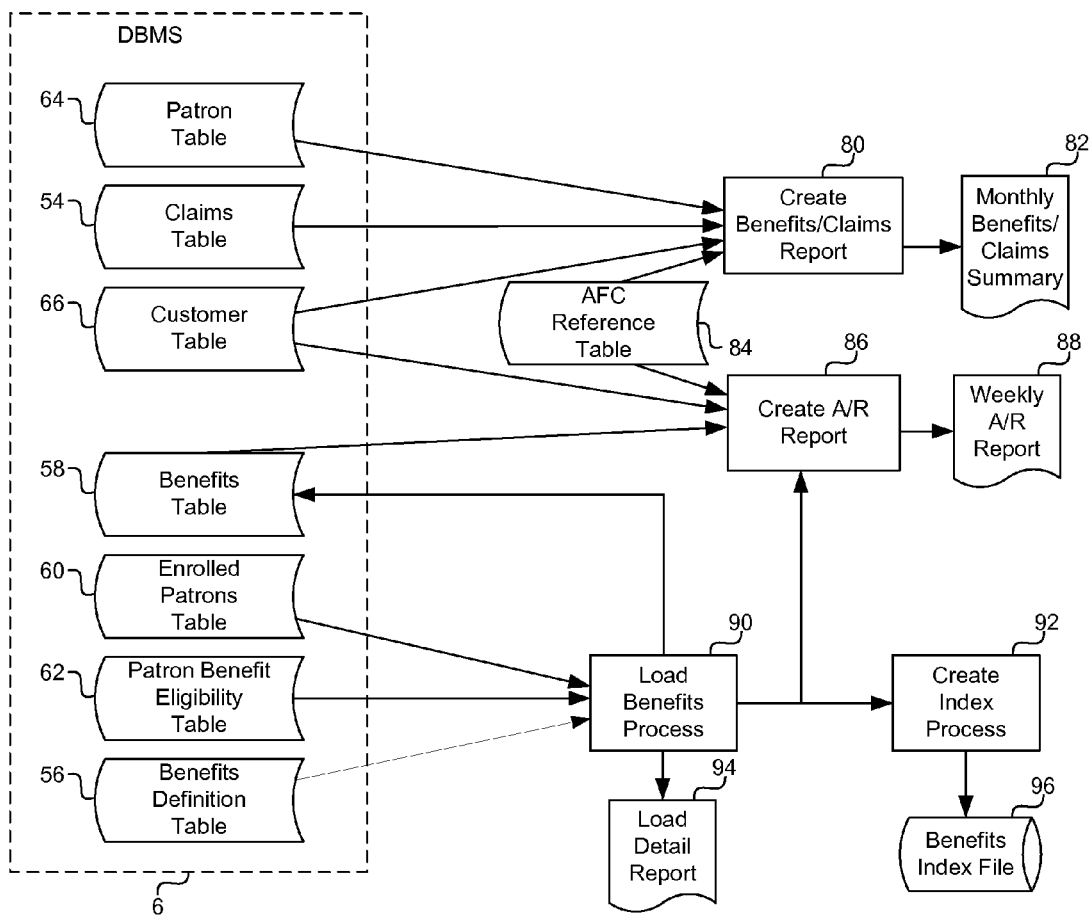
FIG. 3 is a flow diagram of batch processing of a preferred embodiment.

As illustrated in the flow diagram of batch processing in FIG. 3, the credits benefits system 2 of the preferred embodiment tracks maintenance of patron benefits by customer 66 and patrol 64 for the purpose of auditing maintenance actions. In addition, fare media purchased using benefits claim 54 are recorded by the central computer for the purpose of auditing the use of benefits. Referring to FIG. 1, in a preferred embodiment, customer users 20, 22 are given online access to the last six benefits authorized and claimed. In other embodiments, the benefits system 2 provides the customer with all transactions by a patron 24. In addition, reporting of benefit activity includes a monthly benefits/claims summary 82, as shown in FIG. 3, of patron exit and parking transactions to allow the customers 20, 22 to monitor smart card 30 usage, and to determine which, if any, patrons 24 did not claim their benefits. In one embodiment of the present invention, the report summarizes benefit use and does not distinguish benefits value deducted at the gate and parking lot equipment from the value originating from value added to the smart card by the patron using cash, credit, or debit. The system of the preferred embodiment also produces weekly accounts receivable ("A/R") reports 88 for the transit accounts receivable. The accounts receivable reports 88 list benefits authorized and benefits claimed. In a preferred embodiment, the monthly and weekly reports 82, 88 are delivered electronically to the customers 20, 22.

Patron benefits, customer profiles, and user profiles information is stored in the central computer 4 in benefits data storage tables 6. Table 1 lists typical information that may be included in the storage tables 6 of a preferred embodiment. The lists are not exhaustive and may include additional information as deemed necessary for particular applications of the benefits distribution system 2. Patron benefits data is stored and retrieved according to a benefit identification that is associated with each patron 24. In a preferred embodiment, a smart card serial number that is unique to each smart card 30 is utilized as the benefit identification. As listed in Table 1, the benefits data may include benefit value information, authorization information, hold information, purchase information, and miscellaneous information. Benefit value information includes the type of benefit, the benefit effective start date, the benefit expiration date, the value of the benefit, and an identification of the customer. Authorization information indicates the date and time the benefit was authorized and the identification of the user who authorized the benefit. Hold information indicates the hold status and the reason for the hold, the date and time the benefit was placed on hold, the identification of the user who paced the benefit on hold. Purchase information includes the date and time the benefit was used to make a purchase, the benefit amount used to make a purchase, the vending machine number and location where the benefit was used to make a purchase, the fare medium type that was purchased, and the total value of the purchase. Miscellaneous information may include the date when information was generated to support the accounts receivable reporting, and a source and value used to supplement a patron's benefit.

Customer profile tables include customer identification, name, and address. The benefits coordinator information may include a phone number, name, facsimile number and e-mail address. The customer type field of the customer profile indicates whether the customer is public or private sector. The customer profile also stores information regarding the default patron benefit type and values. User profile tables include user identification, the customer represented by the user, access and update permissions, superuser access status, and optionally, a user name, address, phone, e-mail address, and facsimile.

TABLE 1

| PATRON BENEFITS | CUSTOMER PROFILES | USER PROFILES |
| --- | --- | --- |
| Benefit Identification | Customer Identification | User Identification |
| Benefit effective date | Customer name | User name |
| Benefit expiration date | Customer address | Customer representing |
| Value of benefit | Coordinator information | User information |
| Customer Identification | Customer type | Access permissions |
| Authorization date | Default types and values | Superuser access |
| User ID who authorized | Open | Open |
| Hold status and reason | | |
| Date, time placed on hold | | |
| User ID who placed hold | | |
| Date, time benefit used | | |
| Amount of benefit used | | |
| Machine number | | |
| Fare medium type | | |
| Total value of purchase | | |
| Date info. generated | | |
| Source for added value | | |
| Open | | |

The system of the preferred embodiment of the benefits distribution system 2 includes an archiving ability. Specifically, the benefits and claims tables are archived to conserve disk resources. User and customer profile data stores are maintained online and do not require periodic batch archival.

Figure 2:
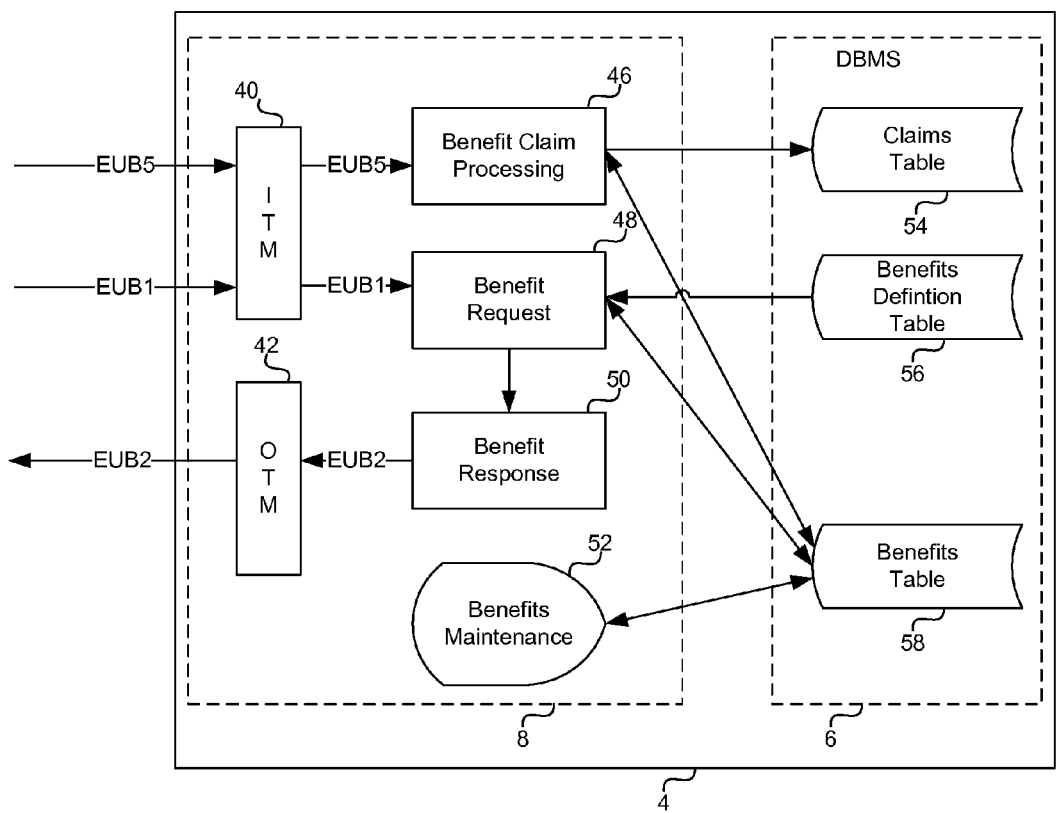
FIG. 2 illustrates the Applications Processor functionality of a preferred embodiment.

FIG. 2 illustrates an applications processor 8 functionality of a preferred embodiment. Applications include benefit claim processing 46, benefit request 48, benefit response 50 and benefits maintenance 52. When a patron 24 initiates a benefits request at an express vending machine 26, the express vending machine sends a transaction request message, designated as EUB1, to the station monitor and display system 28 which, in turn, transmits the request EUB1 to the central computer 4 as an input transaction message ("ITM") 40. The request message EUB1 initiates the processing of a benefit request 48 that looks up the requested benefit in the benefits table 58 and a benefits definition table 56. Upon determination of the status of a request as valid or invalid, the benefits response application 50 initiates the output transmission message ("OTM") 42 of a response message EUB2 to the station monitor and display system 28, which in turn routes the response EUB2 to the originating express vending machine 26. The express vending machine 26 acknowledges receipt of the response and download of a request value onto a smart card 30 utilizing a confirmation message, designated as EUB5. When the station monitor and display system 28 receives positive acknowledgment that the express vending machine has received the transaction, it notifies the central computer 4. The confirmation response message EUB5 initiates the processing of a benefits claim processing application 46 which updates the claims table 54 and benefits table 58 in the benefits data storage 6, and confirms that the benefits are written to a patron's smart card. The benefits maintenance program 52 allows a issuing authority user 14 or customer user 20, 22 to view and/or update benefits information. In a preferred embodiment, benefits are viewable by smart card 30 serial number or by a customer identification.

FIG. 3 is a flow diagram of batch processing of a preferred embodiment of the present invention. Load Benefits 90 is a batch process that is intended to be run weekly. Load Benefits 90 reads data from the benefits data storage 6 tables including an Enrolled Patrons table 60 as maintained by the customers, a Patron Benefit Eligibility table 62 as maintained by the customers, and a Benefits Definition table 56 as maintained by the issuing authority. The Load Benefits Process 90 creates data to be inserted as rows into the Benefits table 58 where the benefits are available for claim by the patrons 24 using a smart card 30 at an express vending machine 26 (see also FIG. 1). The criteria that must be met before the benefit creation in the Benefits table 58 includes a verification that a patron is enrolled and eligible, the effective date for the benefit is a current month or an earlier month, and a required lead date and time is met as explained in detail below. The Load Benefits process 90 produces a Load Detail report 94 that is used to determine the status of benefits processed. The report 94 indicates the results of the Load Benefits process 90 including successful insert in the Benefits table 58 and errors encountered.

The Enrolled Patrons table 60 is read for all patrons eligible for benefits. In a preferred embodiment, status is recognized by the value "E" (enrolled) in a patron_status column of the Enrolled Patrons table 60. Patron status is controlled by the customer 20,22. The Enrolled Patrons table 60 also contains a benefits effective date that is controlled by the customer 20, 22. A customer 20, 22 utilizes the effective date field to control the first month when a benefit is available to the patron 24. A patron 24 may receive benefits as long as the effective date is the same month or a prior month as the patron request processing date. If the effective date is in a future month, requested benefits are not downloaded to the smart card 30 for the patron 24 until that month is current. A typical exception to this future month effective date rule may be when a customer 20, 22 selects the first of the month as the effective date. For example, if the effective dates for a monthly benefit are July 1 to August 1, then a benefit request on June 15 is processed. A Load Detail Report 94 lists the benefit as "LOADED". If the effective date is later than July 1, then a benefit request on June 15 is not processed, and the Load Detail Report 94 lists the benefit as a "FUTURE EFFECTIVE DATE" and will list that future effective date. Continuing with this example, a kickoff date between July 2 and August 1 allows processing in July with effective dates of midnight at the beginning August 1 through midnight at the beginning September 1.

Each Enrolled Patron table 60 row is related to a patron benefit eligibility table 62 using a customer identification and a category type. The Patron Benefit Eligibility table 62 contains at least one, and may contain many rows, for this combination of customer identification and category type depending upon the benefit types which have been assigned to it by the customer 20, 22. Each benefit type is evaluated using the contents of an eligibility_status column. Only those benefit types containing E (enrolled) in the Patron Benefit Eligibility table 62 are loaded to the Benefits table 58. The eligibility_status is controlled by the customer 20, 22.

Each benefit type in the Patron Benefit Eligibility table 62 is related to the Benefits Definition table 56 using benefit_type as the reference. The Benefits Definition table 56 contains a Frequency indicator such as "M" for indicating a monthly benefit. If the Load Benefits application 90 encounters a unrecognized Frequency indicator, then the benefit is rejected and listed in the Load Detail Report 94 with an invalid Frequency message. The Benefits Definition table 56 also contains a lead time number, controlled by the Transit Authority 36, that may be used to establish the minimum number of days lead time before the effective date of the benefit being created. For example, if the Transit Authority 36 requires at least fourteen days lead time before loading a certain benefit type, and the effective date is July 1, the load must occur before June 16. If the benefit is rejected because of this check, the Load Detail report 94 lists a message that the load was later than the required lead time number date.

Upon verification of all required data in the Enrolled Patrons table 60, the Patron Benefits. Eligibility table 62 and Benefits Definition table 56, a row is inserted to the Benefits table 58 using information originating from one of the tables 60, 62, 56. In a preferred embodiment, the Benefits table 58 includes a Card Serial Number, a Customer ID and Manufacturer Serial Number originating from the Enrolled Patrons table 60. A Benefit Type originates from the Benefits Definition table 56. An Initial Value of the benefit originates from the Patron Benefit Eligibility table 62 as maintained by the Customer. The Benefits table also contains a Last Authorization Sequence Number that is initialized with the value 0, a Load Date and Time that is the current run date and time of the batch process, a Remaining Value which contains the same number as the Initial Value Amount, an Effective date that is calculated as the first of the next month beginning at midnight, and an expiration date that is calculated as midnight beginning on the first of the month following the effective period. If the effective date in the Enrolled Patrons table 60 is later than the effective date, the benefit is not processed. Instead, it is inserted and effective for the next month. The Benefits table 58 also contains hold information including a Last Claim Hold Code (Vendor Hold) that is initialized with the value A (available), and a Hold Code (Manual Hold) that is initialized with the value 0 (available). Other columns which record claim request, authorization, and confirmation events are be initialized with appropriate values. The Benefits table 58 may further contain Update Action Code, Update Date/Time, and Update User ID columns for embodiments that provide benefit updating utilizing interactive screens.

The Load Benefits process 90 also checks for a data base duplicate return code during the insert process to protect against inadvertent submission of a load job more than once resulting in duplicate benefits. A duplicate entry is defined as having identical values in the Card Serial Number, Customer ID, Benefit Type, and Effective Date fields. The Load Detail Report 94 prints a Duplicate Benefit message if a duplicate entry is encountered, and the benefit is not loaded to the Benefits table 58. Because Customer ID is used to define uniqueness, it is possible that the same smart card 30 may be used by one patron who collects benefits from more than one employer. Thus, a duplicate Customer ID, by itself, does not trigger a duplicate return code.

Continuing with FIG. 3, included in the load process job stream is an Accounts Receivable Report process 86 for generating an accounts receivable report 88 of benefits loaded for the purpose of invoicing customers. The Accounts Receivable ("A/R") report process 86 uses a range of load dates that is defined and varied using an entry in an Automated Fare Collection ("AFC") Reference Table 84 since fares may vary depending on the date of a benefits request. The Reference Table 84 is maintained by the Transit Authority 36. The Accounts Receivable report process 86 may also be submitted as a stand-alone job.

The Benefits and Claims Report process 80 of a preferred embodiment creates a benefits/claims report 82. The report 82 lists claims matched with benefits and calculates the difference in values, if any, as Unclaimed Benefits. Unclaimed Benefits information may be utilized for possible credit to the Customer 20, 22. The benefits/claims report 82 includes data for benefits that have expired within a defined date range using an entry in the Reference Table 84 as maintained by the Issuing Authority 36. The Report application 80 utilizes patron information from a Patron table 64, customer information from a Customer table 66, and information from the claims table 54.

The batch Load Benefits process 90 also includes a Create Index process 92 to create a benefits index file 96. The benefits index file 96 is used by the Benefits Maintenance screen 52, as shown in FIG. 2, as an index to the Benefits table 58 to maximize screen response to a user's browse command.

Figure 4:
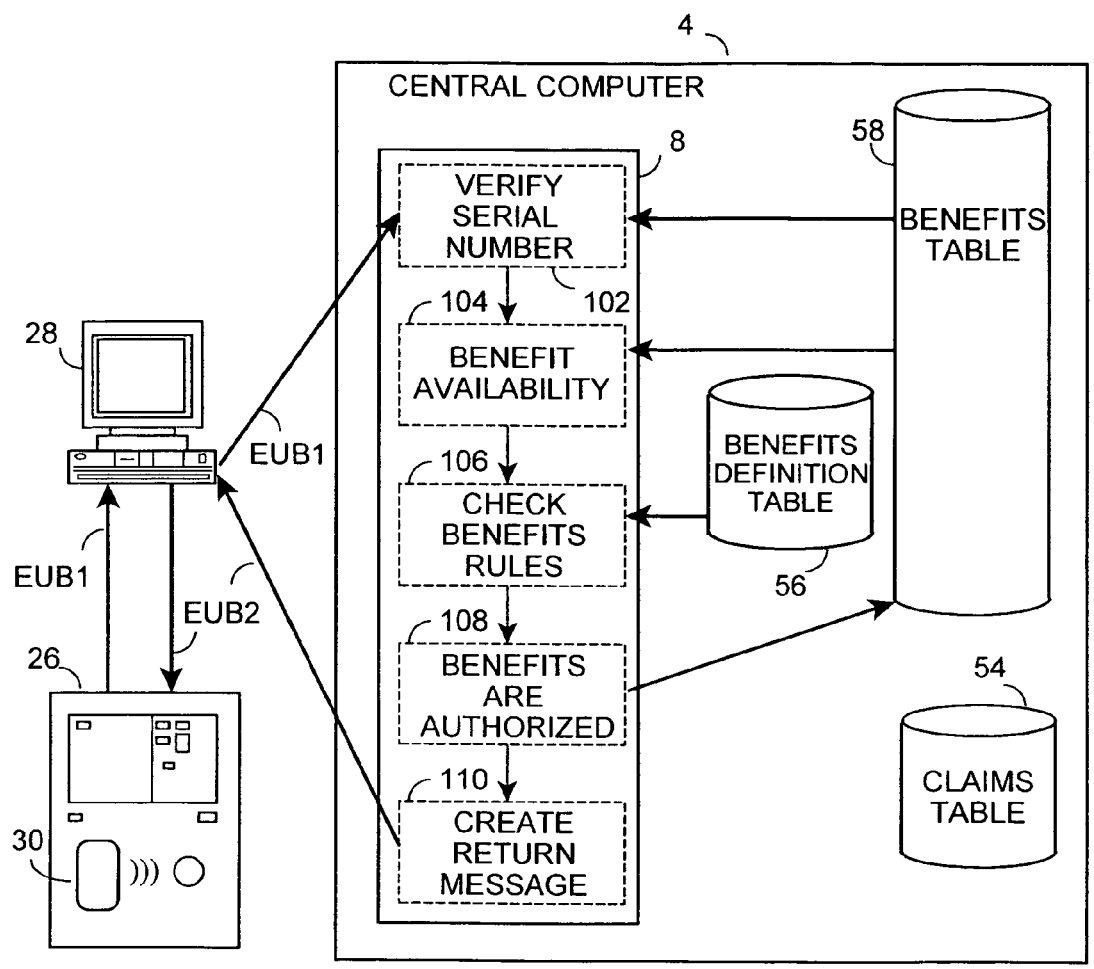
FIG. 4 illustrates a request/response message processing of a preferred embodiment.

FIG. 4 illustrates a benefits request and response message processing of a preferred embodiment of the benefits distribution system 2. A benefits request message EUB1 is initiated by a patron with a smart card 30 at an express vendor 26 and is transmitted through a SMADS 28 to the central computer 4. The preferred embodiment utilizes a fixed request value of $200.00 which is a maximum amount that can be loaded onto a smart card 30 assuming an initial card value of zero. The fixed request of other embodiments may be specified by the issuing authority 36 or the customer 20,22 as shown in FIG. 1. Referring again to FIG. 4, when the express vendor 26 transmits the benefits request EUB1, a timeout process is actuated. The timeout process of a preferred embodiment allows 44 seconds to receive a response EUB2 to the benefit request EUB1 before the express vendor 26 terminates the transaction. The timeout process timer of other embodiments may vary according to expected connection response time of a system 2.

Figure 7:
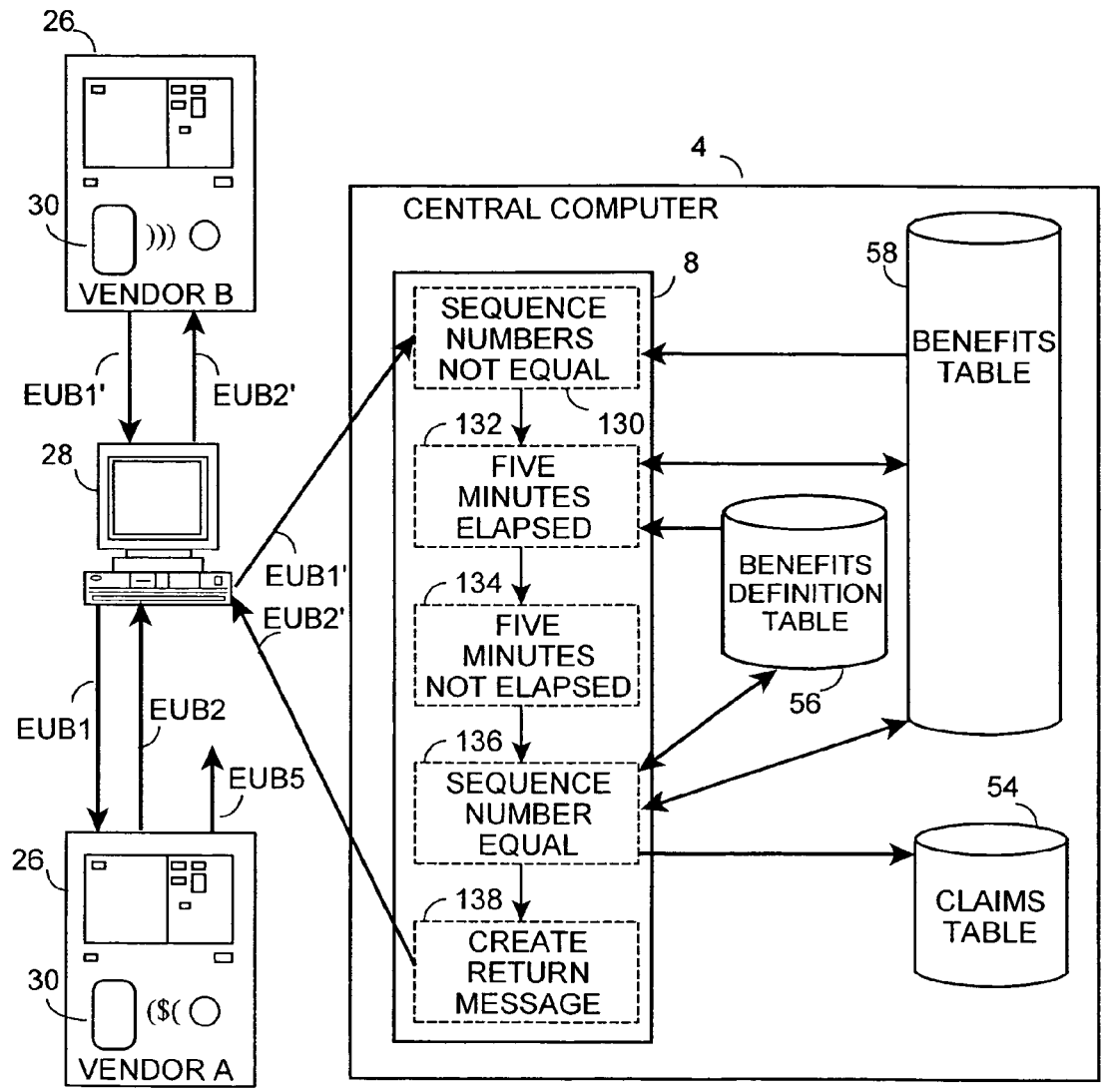
FIG. 7 illustrates contingency confirmation message processing of a preferred embodiment.

The benefit request message EUB1 contains the Last Authorized Benefit Sequence Number as it is read by the express vendor 26 from the smart card 30. The Sequence Number is processed during the response message EUB2 and is used by the central computer applications 10 when entering contingency benefits processing as shown in FIG. 7 and explained in detail below. In a preferred embodiment, the central computer responds to the request message EUB1 with a MACKEUB1 STATUS=0 to indicate receipt of the request message EUB1. However, regardless of the MACKEUB1 status, the express vendor 26 continues the timeout processing.

The correct response to the request message EUB1 is the benefits response message EUB2. If no response message EUB2 is received by the express vendor 26 when the timeout value expires, the express vendor 26 advises the patron 24 that the transaction cannot be processed. If the response message EUB2 is received after the timeout has expired, the express vendor 26 automatically generates a confirmation message EUB5 that contains an amount of $0.00 claimed.

Upon receiving the benefits request EUB1, the central computer 4 verifies the serial number 102 received from the express vendor 26 with the valid Card Serial Numbers listed in the Benefits table 58. If no benefit is found, the response message EUB2 contains a return value of $0.00 in a Requested Value or Price field. If one or more benefits are resident in the Benefits table 58, the benefit availability 104 is evaluated according to the benefit effective date, the benefit expiration date, the vendor hold status, and the manual hold status. The requested benefits are not processed if the Vendor Hold does not contain the value "A" (available). If the benefit is in Vendor Hold status (value="N"), further logic is applied for the contingency that a confirmation message EUB5 was not received by the central computer 4 as illustrated in FIG. 7. If the benefits are on Manual Hold, the response message EUB2 contains the value $0.00 in the authorized amount.

Upon verification of benefit availability 104, the Purse or Class Identifier in the request message EUB1 is evaluated 106. Each benefit in the Benefits table 58 contains a Benefit_Type. That Benefit_Type is looked up in the Benefits Definition table 56 to ensure that the Purse or Class Identifier is valid for the Benefit_Type. For example, a value 128 is used for the General Use Purse of a preferred embodiment. The Benefits Definition table 56 contains a column titled Product_Purse_Rules. In the current example, position 128 of that column is evaluated. If that position contains "Y", the benefit is allowed for this type of product. If position 128 contains "N", the benefit type is NOT allowed for this type of product, and the response message EUB2 transmits $0.00 in the Requested Value or Price to the vendor 26.

In a preferred embodiment, the Benefits Definition table 56 also contains a column titled Bonus_Rules. Similar to the Product_Purse_Rules, the column, of this example, is evaluated in position 128. If position 128 of the Bonus_Rules in the Benefits Definition contains "1", the response message EUB2 contains "1" in a "Bonus Flag" field and the express vendor 26 calculates an award bonus. If position 128 contains "0" in the Bonus_Rules column, the response message EUB2 contains "0" in the "Bonus Flag" field and the express vendor 26 does not award a bonus. In this manner, bonus calculation is controlled by a Benefits Definition table 56 in the central computer 4 and not with software logic i the express vendor 26.

The benefit availability step 104 also determines the sum value of all benefits authorized, and returns the value in the response message EUB2. The sum does not exceed the amount requested in the request message EUB1, and the maximum amount authorized in the response EUB2 is $200 for the preferred embodiment, subject to the previously noted limitations. If there is more than one benefit contained in the Benefits table 58 for smart card 30, each benefit is evaluated separately for benefit availability 104 and benefit rules 106.

Figure 6:
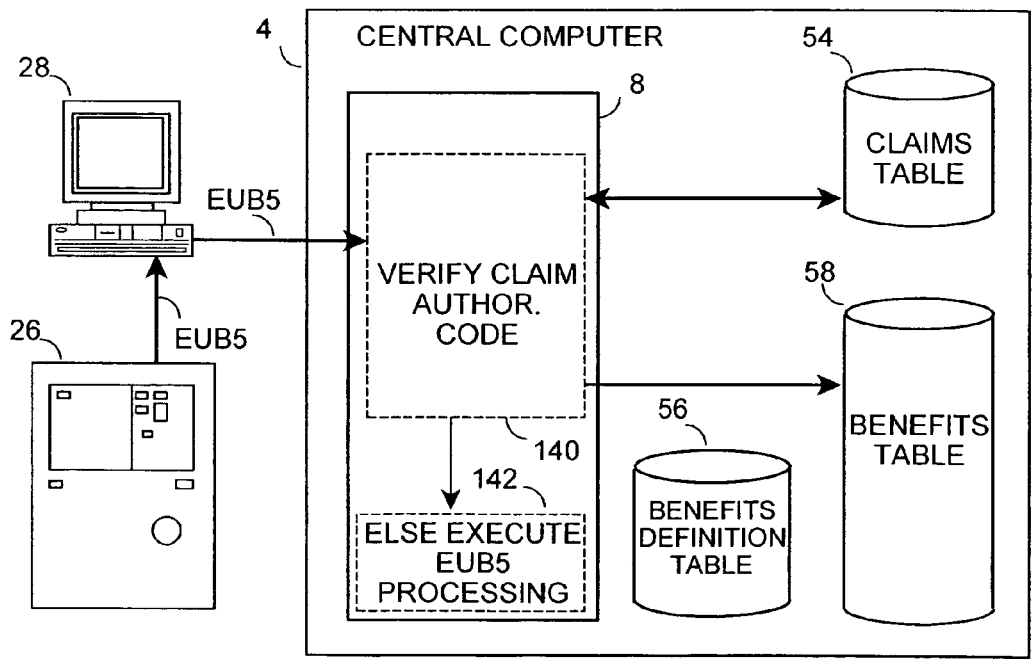
FIG. 6 illustrates late confirmation message processing of a preferred embodiment.

If benefits are authorized 108, the benefit rows of the benefits table 58 are updated. The Last Authorized Benefit Sequence Number from the request message EUB1, that originated from the smart card 30, is incremented by one and stored in the Benefits table 58. This value may be observed in a benefits maintenance 52 screen of a preferred embodiment. The central computer 4 creates an Authorization Code and records this in the Benefits table 58. The Authorization Code also is contained in the Response message EUB2. The Authorization Code is later used to recognize a late confirmation message EUB5 as illustrated in FIG. 6 and described below. The Vendor Hold status is set to "N" to prevent the patron 24 from claiming benefits simultaneously at two express vendors 26. The first request message EUB1 is processed, while the second request message EUB1, as shown in FIG. 7, returns $0.00 in the amount authorized because the benefit is in "Vendor Hold" status.

Continuing with step 108, the "Last Request" columns are updated. Included in these columns are the "Request Type", which is the date and time of the request and the Retrieval Reference number which was generated by the vendor and transmitted in the request message EUB1. The "Last Claim" columns also is updated. This information includes the amount authorized in the EUB2, the date and time of the transaction, the Last Authorized Sequence Number and the Authorization code. This information is used in the "missing EUB5" scenario illustrated in Contingency Benefits Processing of FIG. 7. The Last Request and Last Claim columns are also observable in a benefits maintenance 52 screen of a preferred embodiment.

The Benefits Response EUB2 is formatted and returned to the SMADS 28 and express vendor 26 that generated the original benefit request EUB1. The response message EUB2 contains the amount authorized and the incremented "Authorized Benefit Sequence Number." In the preferred embodiment, the station monitor and display system 28 responds to the response message EUB2 utilizing a "MACKEUB2 STATUS=0". However, If the "MACK0" is not received by the central computer 4, the benefit status is not altered nor "reversed". Upon receipt of the Benefits Response EUB2, the express vendor 26 evaluates the message fields. The Response must match an EUB1 transmitted by the express vendor 26. The match criteria are Card Type, Serial Number, Retrieval Reference Number and express vendor Address. If the response message EUB2 is not matched, or the express vendor's timeout value has expired, the express vendor 26 returns a confirmation message EUB5 to the central computer 4 containing $0.00 in the "Requested Value or Price" field.

Figure 5:
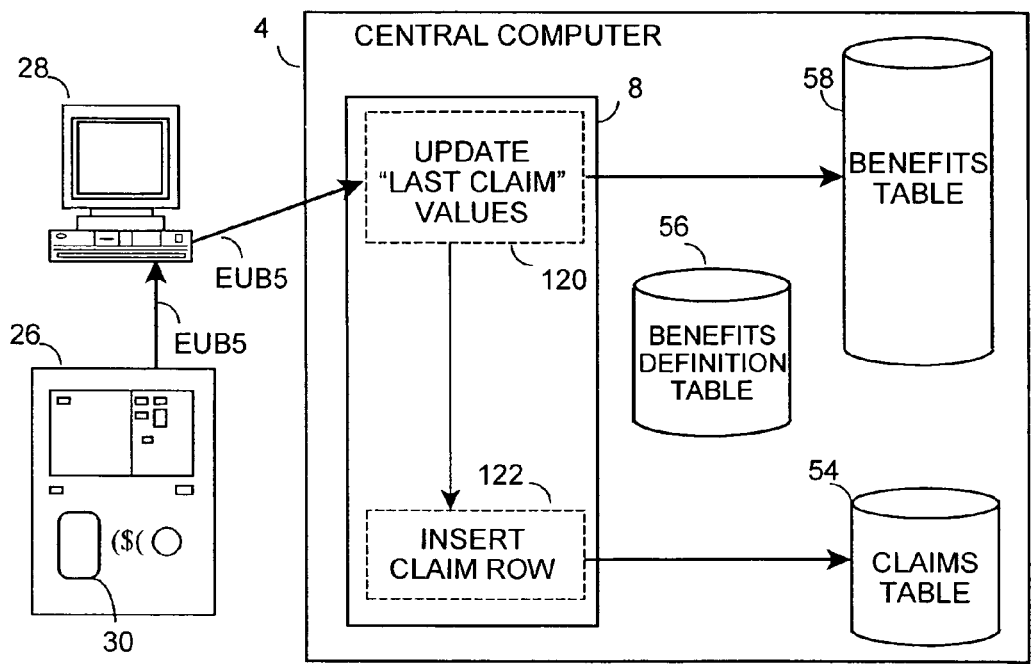
FIG. 5 illustrates a confirmation message processing of a preferred embodiment.

FIG. 5 illustrates a confirmation message processing of a preferred embodiment. If the response message EUB2 arrives at the express vendor 26 within the timeout value and the response message EUB2 is matched with a previous EUB1, the Vendor's panel displays the authorized amount. The patron 24 may reduce the amount or cancel the transaction, but is not permitted to increase the amount. The express vendor 26 patron interface allows the patron to supplement value using debit, credit, cash or farecard trade in. However, in a preferred embodiment, the express vendor 26 may not increase the General Use Purse over a predetermined maximum value of $200.00. The express vendor 26 processes a bonus if the response message EUB2 contains a "1" in the Bonus Flag field. This value ultimately originated from a Bonus_Rules column in the Benefits Definition table 56. If the response message EUB2 contains "0" in the Bonus Flag field, the express vendor 26 does not award a bonus.

If the patron 24 cancels the transaction or the express vendor 26 receives no response from the patron, e.g., the patron walked away from the transaction, the express vendor 26 prepares a confirmation message EUB5 containing $0.00 in the "Requested Value or Price" field. The confirmation message EUB5 is transmitted through the SMADS 28 to the central computer.

When a patron 24 completes a benefits transaction, the smart card 30 is updated with the returned request amount and the "Authorized Benefit Sequence Number" as received in the response message EUB2. The express vendor 26 then formats the confirmation message EUB5 and sends the message EUB5 to the SMADS 28, which in turn sends the message to the central computer 4. The confirmation message EUB5 is a financial transaction that affects the patron's benefit value. For this reason, if either the express vendor 26 or the station monitor and display system 28 do not receive a correct message acknowledgment, the confirmation message EUB5 is stored indefinitely until the correct message acknowledgment is received. In the case of the SMADS 28 to central computer 4 interchange, the SMADS 28 does not delete the confirmation message EUB5 from its memory/disk files until it receives a MACKEUB5 STATUS=0 from the central computer 4.

The confirmation message EUB5 contains only the benefit amount claimed by the patron 24. It does return bonus amounts or amounts added by the patron 24 using cash, credit, debit or fare card trade-in. The benefit amount may be the entire amount authorized in the response message EUB2. However, if the patron 24 reduces the benefit authorization, or the smart card 30 General Use Purse exceeds a maximum amount, e.g., $200.00, by adding the full benefit, then the confirmation message EUB5 returns an amount less than that authorized in the response message EUB2.

When the central computer 4 receives a benefits confirmation message EUB5, and the Authorization Code is not already in the claims table 54, it adds the EUB5 message data to the Claims table 54 for each benefit processed 122. Because it is possible for a single benefit to have many claims, the claims are distinguished by different Authorization Codes. The confirmation message EUB5 also initiates an update procedure 120 of the Benefits table 58. The "Last Claim" values are updated including the Last Claim Amount as reported in the confirmation message EUB5, the date and time of the claim, the Authorization Code of the claim, and the vendor hold status is changed to "A" to indicate that the remaining benefit value, if any, is available to the patron.

The update of the last claim values step 120 also updates the remaining value of the patron benefit. The claim amount from the confirmation message EUB5 is subtracted from the "Amount Remaining". The result is used to create a new "Amount Remaining." For example, if a patron 24 claimed all benefits available, the "Amount Remaining" is updated to zero. If the patron claimed $50 out of $120 available, the new "Amount Remaining" is $70. The amount remaining is available to the patron 24 until the benefit expires or is placed on hold. If the confirmation message EUB5 contains $0.00 claimed, for example, during a "walkaway" or patron cancellation, the entire amount indicated in the response message EUB2 is restored and available to the patron for subsequent claims.

If there is more than one benefit found during confirmation message EUB5 processing, the "Amount Remaining" of the earliest benefit to expire is decreased by the claimed amount. If the amount claimed is more than the "Amount Remaining" in that "earliest to expire" benefit, the balance of the confirmation message EUB5 claim amount is subtracted from a remaining, or next to expire, benefit.

FIG. 6 illustrates a late confirmation message processing of a preferred embodiment. Processing of the confirmation message EUB5 incorporates an allowance for the contingency that delivery of a confirmation message EUB5 is delayed. Even though the confirmation message EUB5 must receive a message acknowledge status before it is released from the station monitor and display system 28, there may be an occasion when the confirmation message EUB5 is received by the central computer 4 after a patron 24 attempts to make another claim for remaining value. The confirmation message EUB5 includes an Authorization Code that was created by the central computer 4 during response message EUB2 processing. The Authorization Code is unique for each claim. Thus, when a delayed confirmation message EUB5 is received, the central computer 4 first verifies whether a claim has been processed by searching in the claims table 54 for the same Authorization Code 140. If a claim with the same Authorization Code is found in the Claims table 54, an adjustment claim row is created in the claims table 54 and the benefit balance is adjusted in the benefits table. If the authorization code does not match, then the central computer executes normal confirmation message processing 142 as illustrated in FIG. 5.

FIG. 7 illustrates a contingency confirmation message processing of a preferred embodiment. If the patron 24 requests a second claim before an confirmation message EUB5 for a first claim is processed, the central computer 4 processing recognizes this condition by the presence of an "N" in the "Vendor Hold" column. If the confirmation message EUB5 has been received, the vendor hold column contains an "Y". Thus, at least two scenarios may have occurred if a second request EUB1' is made before receipt of a first confirmation message EUB5, that is, either the patron 24 received the benefits from the first claim or the patron 24 did not receive the benefits from the first claim.

If the benefit is in a "Vendor Hold" status, logic determines whether or not the first claim was successful, i.e., the patron 24 received the benefits, by comparing a Last Authorization Code column in the Benefits table 58 with the "Last Authorized Benefit Sequence Number" in the second benefit request EUB1' as shown in step 130 of FIG. 7. If the sequence numbers are the same, then the card's "Sequence Number" was updated, and the patron successfully completed the first claim at an express vendor "A" 26. In this case, the logic defaults to creation of a claim in step 136, in lieu of the first EUB5, using the full amount authorized in the first benefits response EUB2. This processing is designed to handle a most probable situation wherein the patron claims and loads all available benefits value. If there is value remaining in the benefit, that amount is authorized in the second benefits response message EUB2' in step 138. If there is zero value remaining, the second benefits response message EUB2' contains $0.00 authorized. If the patron reduced the first authorized amount in response message EUB2, then the value difference is not available until the original EUB5 is received and processed.

For example, in a first most likely scenario, the patron claims all benefits value of $50. The patron is authorized $50 in a first response EUB2 and claims $50 to the card. The $50 value and a new sequence number is written to the card. The confirmation message EUB5 is not received at the central computer 4. A subsequent request EUB1' by the patron for the full value $50 is received at the central computer with an equal sequence numbers. The missing confirmation message EUB5 is offset by the most likely situation of a full claim, and the second response message EUB2' authorizes $0.00.

In a second example, the patron is authorized $50 and claims $20 to the card. The EUB5 is not received. A subsequent request EUB1' with equal Sequence Numbers creates a claim for the full $50. The remaining $30 is not available to the patron until the "missing" confirmation message EUB5 is processed. When that EUB5 is processed, a credit or $30 is restored to the patron in a delayed confirmation message processing as shown in FIG. 6.

In a second scenario as illustrated in FIG. 7, the confirmation message EUB5 is missing and the patron has not received benefits from the first claim EUB1. If the benefit is in a "Vendor Hold" status and the last authorization code in the Benefits table 58 does not match "Last Authorized Benefit Sequence Number" in the second benefit request EUB1', then the patron did not receive benefits from the first claim EUB1 at express vendor "A" 26. If a specific time period has elapsed, then the logic defaults to allowing the new request EUB1' to process. In the preferred embodiment, the processing utilizes a five minute time out as shown in step 132 of FIG. 7. In this "missing EUB5" scenario, if five minutes have passed, the "Vendor Hold" is lifted and the new EUB1 Request is processed as if the first did not take place. If five minutes has not elapsed 134, then the response message EUB2' returns a value of $0.00. The five minute restriction greatly reduces the possibility that the patron is attempting simultaneous benefit requests from two vendors 26.

An example of the second scenario occurs when the patron is authorized $50, but does not receive the value on the smart card 30. Since the value was not written to the smart card 30, then the sequence number on the smart card 30 remains unchanged. The confirmation message EUB5 that should contain the received amount $0.00 is not received by the central computer 4. After five minutes, the full $50 is available to the patron under a second request EUB1'. There are no claims or adjustments required for the first EUB1 Benefits Request.

On the rare occasion that duplicate confirmation messages EUB5 are received from the station monitor and display system 28, the confirmation messages EUB5 are rejected immediately by the central computer 4 processing. This feature is handled by database referential integrity which checks for duplicate rows in the Claims table 54.

Although a preferred embodiment of the invention has been described above by way of example only, it will be understood by those skilled in the field that modifications may be made to the disclosed embodiment without departing from the scope of the invention, which is defined by the appended claims.

We claim:

1. A system for enabling an issuing authority to distribute benefits to a plurality of patrons, the system comprising:
at least one smart card associated with each patron of the plurality of patrons, the at least one smart card having a serial number and means for storing information, the smart card configurable to operate in a plurality of benefit types;
a central computer with access controlled by the issuing authority and having applications for processing benefits information, wherein:
the benefits information includes a benefits monetary value associated with each said patron;
the central computer includes a benefits storage device for storing the benefits information;
the issuing authority grants a benefits provider permission to access the benefits storage device to input or update the benefits monetary value, the benefits provider comprising a different entity than the issuing authority;
an entry means allowing the benefits provider to input or update the benefits monetary value to the benefits storage device; and
an express vending machine having a bidirectional electronic connection to the central computer for accepting a transfer of at least a portion of the benefits monetary value stored at the benefits storage device to the at least one smart card, the express vending machine comprising:
a user interface for each said patron to:
receive an amount of value from the patron and transfer at least a portion of the amount of value to the benefits storage device;
select a first amount of benefits monetary value to be transferred from the benefits storage device to the at least one smart card;
select a first benefit type from the plurality of benefit types available for operation on the at least one smart card;
assign the first amount of benefits monetary value to the first benefit type on the at least one smart card;

select a second amount of benefits monetary value to be transferred from the benefits storage device to the at least one smart card;

select a second benefit type from the plurality of benefit types available for operation on the at least one smart card, wherein the second benefit type comprises a term that defines a period of time during which the second benefit type is allowed to be used; and assign the second amount of benefits monetary value to the second benefit type on the at least one smart card, wherein upon expiration of the term, a default condition is applied to convert the second amount of benefits monetary value to a value stored in an unrestricted cash purse on the at least one smart card; and a read/write mechanism for:

reading the at least one smart card;

writing the selected benefits monetary value to the at least one smart card;

writing the selected first benefit type to the at least one smart card; and writing the selected second benefit type to the at least one smart card, wherein the first benefit type and the second benefit type are different benefit types and the first benefit type and the second benefit type are present on the at least one smart card at the same time.

2. The system for distributing benefits as in claim 1, wherein the entry means for inputting benefits information is a terminal connected to the central computer by means of an intranet connection.

3. The system for distributing benefits as in claim 2, further comprising a smart card read/write device connected to the terminal for writing the at least a portion of the benefits monetary value to the at least one smart card; wherein at least a second portion of the benefits monetary value remains stored on the central computer.

4. The system for distributing benefits as in claim 1, further comprising:

a web server connected to the central computer; and a remote terminal connected to the web server by means of an internet connection, the remote terminal allowing the benefits provider to input or update the benefits information including the benefits monetary value via the entry means.

5. The system for distributing benefits as in claim 4, further comprising a smart card read/write device connected to the terminal for writing the at least a portion of the benefits monetary value to the at least one smart card.

6. The system for distributing benefits as in claim 1, wherein the issuing authority is a transit system authority.

7. The system for distributing benefits as in claim 6, wherein the at least one smart card is used for purchasing transit fares and parking fees from the transit authority.

8. The system for distributing benefits as in claim 1, wherein the benefits provider is a welfare agency.

9. The system for distributing benefits as in claim 8, wherein the benefits are for food expenses, and wherein the at least one smart card is used for purchasing food.

10. The system for distributing benefits as in claim 1, wherein the express vending machine further comprises a station monitor and display system for connecting the express vending machine to the central computer, the station monitor and display system for collecting transaction and maintenance data from the express vending machine.

11. The system for distributing benefits as in claim 10, wherein the station monitor and display system forward the transaction and maintenance data to the central computer for consolidation and preparation of a plurality of management reports.

12. The system for distributing benefits as in claim 1, wherein the express vending machine has an add value function for each said patron to add value to the at least one smart card separate and in addition to the benefits monetary value.

13. The system for distributing benefits as in claim 1, wherein the benefits provider comprises one of a plurality of benefits providers, wherein the benefits provider is responsible for offering the benefits to a set of patrons of the plurality of patrons, and wherein the benefits provider is liable to the issuing authority for the benefits monetary value distributed to the set of patrons.

14. The system for distributing benefits as in claim 13, wherein the benefits provider is a private employer.

15. The system for distributing benefits as in claim 13, wherein the benefits provider is a public employer.

16. A method for distributing benefits to a patron of a plurality of patrons, the method comprising the steps of:

maintaining a benefits data base in a central computer, the benefits data base including benefits information for the plurality of patrons, the benefits information including a patron identifier and a monetary benefit value for the patron;

receiving, at the central computer system, an input from a benefits provider to increase the monetary benefit value for the patron, wherein the benefits provider is different entity from an issuing authority for a smart card and the issuing entity gives the benefits provider permission to access and control the monetary benefit value for the patron in the benefits data base;

increasing the monetary benefits value for the patron in the benefits data base in response to the received input;

downloading at least a portion of the increased monetary benefit value to the smart card in a first benefit type according to a selection of an amount and of the first benefit type from a plurality of benefit types available for operation on the smart card by the patron at a vending machine;

configuring the smart card for the first benefit type from the plurality of benefit types available for operation on the smart card;

receiving, at another or the same vending machine, an input from the patron to change the benefit type from the first benefit type to a second benefit type from the plurality of benefit types available for operation on the smart card, wherein the second benefit type comprises a term during which the second benefit type is allowed to be used;

reconfiguring the smart card for the second benefit type;

receiving, at another or the same vending machine, a deposit of monetary value from the patron unassociated with a particular benefit type;

storing, at the central computer system, at least a portion of the monetary value unassociated with a particular benefit type for the patron in the benefits data base in response to the received monetary value; and applying a default condition upon expiration of the term to convert the second benefit type to a value stored in an unrestricted cash purse on the smart card.

17. The method of distributing benefits as in claim 16, wherein step of maintaining a benefits data base includes allowing the benefits provider to enter benefits data into the benefits data base utilizing a remote terminal.

18. The method of distributing benefits as in claim 17, wherein the remote terminal is connected to the main computer by means of an Internet connection.

19. The method of distributing benefits as in claim 16, wherein the step of downloading further includes the steps of:
    requesting a claim at the vending machine;
    sending a request message to the central computer;
    sending a response message from the central computer to the vending machine, the response message containing an authorized value;
    writing the authorized value to the smart card;
    sending a confirmation message to the central computer that the authorized value was written to the smart card.

20. The method of distributing benefits as in claim 19, wherein the request message includes a serial number from the smart card, a sequence number, and a requested value, and wherein the confirmation message is not received by the central computer, further comprising the step of:
    verifying the sequence number against a stored sequence number to determine whether the card has received the requested value in a prior transaction.

21. A system for distributing benefits, the system comprising:
    a benefits provider computer for a benefits provider comprising an employer entity, the benefits provider computer configured to:
        confer a transit benefit to a patron comprising an employee of the employer entity, the transit benefit comprising a monetary value and conferred as part of an employment relationship;
        receive permission to control a monetary benefit value for the patron in a remotely located benefits data base for a transit authority computer;
        transmit data loading the monetary value of the transit benefit to the benefits data base for the patron; and
    a transit authority computer for a transit authority, in communication with the benefits provider computer, and configured to:
        maintain a benefits data base including a monetary benefit value for the patron, wherein monetary benefit value in the benefits data base remains unassociated with a particular benefit type;
        receive the transmitted data from the benefits provider computer directing the loading of the monetary value of the transit benefit to the monetary benefit value for the patron, the received data causing the benefits data base to reflect the loaded monetary value;
        receive, from the patron at a remote terminal, a selection of a first amount of benefits monetary value to be transferred from the benefits data base and a selection of a first benefit type from a plurality of benefit types available for operation on a smart card;
        transmit data to transfer the selected amount of the monetary benefit value in the selected first benefit type for the patron from the benefits data base to the smart card;
        receive, from the patron at another or the same remote terminal, a selection to transfer at least a portion of the monetary value to a selected second benefit type from a plurality of benefit types available for operation on a smart card, wherein the second benefit type comprises a term during which the second benefit type is allowed to be used;
        transmit data to transfer the at least a portion of the monetary value in the selected first benefit type on the smart card to the selected second benefit type on the smart card, wherein the first benefit type and the second benefit type are present on the smart card simultaneously; and
        apply a default condition upon expiration of the term, the default condition converting the second benefit type to a value stored in an unrestricted cash purse on the smart card.

22. The system of claim 21, wherein the transit authority computer is further configured to determine, in response to the received selections, to perform the transfer without first accessing the benefits provider computer.

23. The system of claim 21, wherein the benefits provider computer is further configured to:
    transmit data to modify the monetary value of the transit benefit in the benefits data base for the patron.

24. The system of claim 21, wherein the transit benefit comprises a selection from the group consisting of a rail benefit, a bus benefit, other transit benefits, a parking benefit, and any combination thereof.

25. The system of claim 1, wherein the plurality of benefit types comprise an unrestricted stored value, rail value, parking value, bus value, and general transit value.

* * * * *